F. G. JOHNSON.  Map and Chart Rack.
No. 125,960.  Patented April 23, 1872.
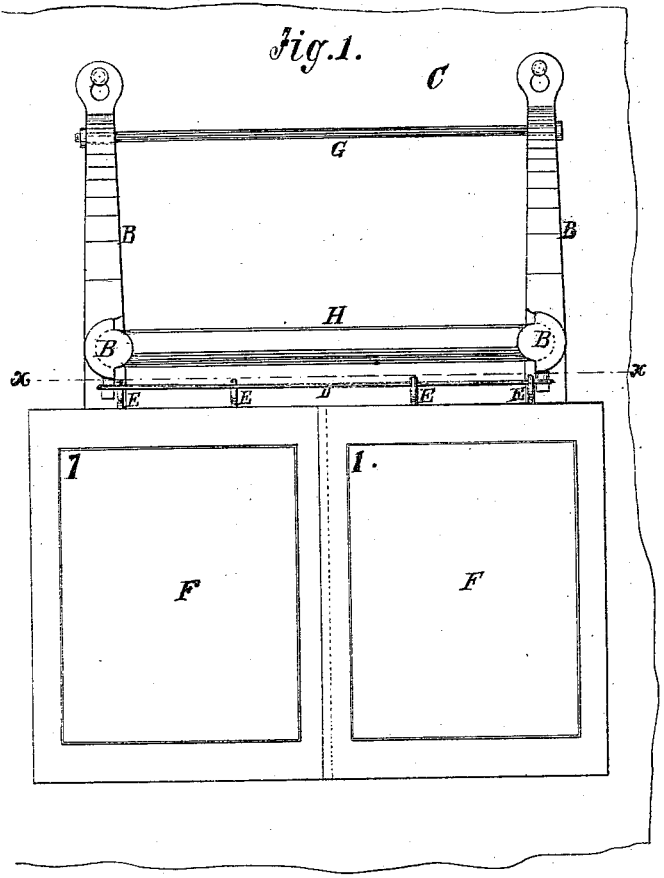
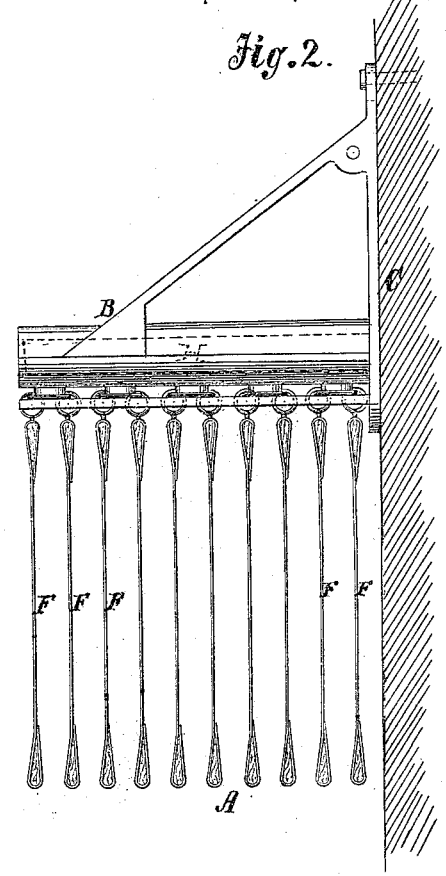
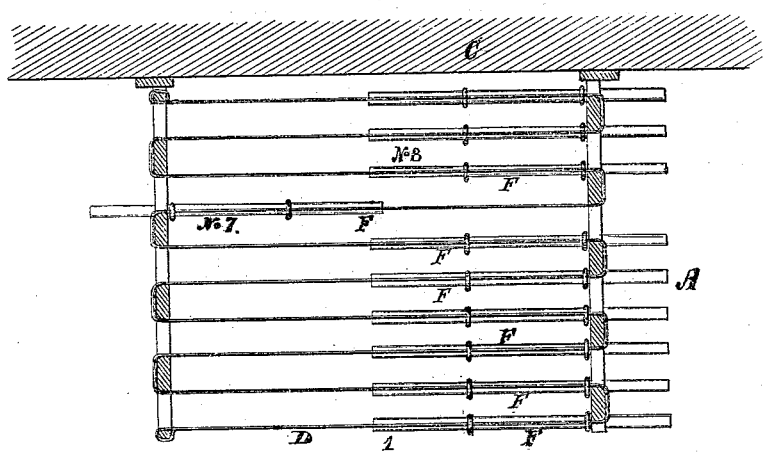
Witnesses:
A. Bennersendorf
Wm. H. C. Smith
Inventor:
F. G. Johnson.
per
Attorneys.

125,960

UNITED STATES PATENT OFFICE.

FRANK G. JOHNSON, OF BROOKLYN, NEW YORK.

IMPROVEMENT IN MAP AND CHART RACKS.

Specification forming part of Letters Patent No. 125,960, dated April 23, 1872.

Specification describing certain Improvements in Sliding Map and Chart Rack, invented by FRANK G. JOHNSON, of Brooklyn, in the county of Kings and State of New York.

The object of this invention is to provide convenient means for exhibiting maps, charts, sheets of music, engravings, &c., designed more especially for school and lecture rooms, but applicable to all similar purposes; and it consists in lever-brackets projecting from the wall or from a portable frame, and in suspending wires or rods, and in tension-rods for straining the suspending-wires, and in arranging the whole so that charts, maps, sheets of music, &c., may be allowed to slide laterally, and so that any single one may be exhibited in full or in part, as will be hereinafter more fully described.

In the accompanying drawing, Figure 1 represents a front view. Fig. 2 is a side view, and Fig. 3 is a horizontal section of Fig. 1 taken on the line $x$ $x$.

Similar letters of reference indicate corresponding parts.

In this example of my invention the maps, charts, &c., are shown suspended from two lever-brackets which are attached to the wall, and under ordinary circumstances this may be the most convenient mode of exhibiting them; but to secure the full effect of light upon the maps, charts, &c., the brackets may be attached to a movable frame or stand.

A represents a series of maps or charts arranged on slides in a compact body. B are the brackets, which act as levers. C is the wall. D are the suspending wires or rods on which the maps or charts slide. F represents the maps, charts, &c. E are the eyes attached to the slat at the top or upper edge of each map or chart, by means of which the latter are attached to the suspending wires D. H is the fulcrum-shelf. The suspending wires D are secured to the bracket or other fixture at the ends, and are strained to keep them tight and rigid, so that the maps, &c., will hang perpendicular by means of a screw tension-rod, G. (See Fig. 1.) Each map or chart is hung to the wire or rod D by two eyes, E, so that it will be properly balanced.

The maps, charts, &c., are arranged, as seen in the drawing, near together, and one in front of the other, leaving sufficient space to allow any one to slide freely back and forth.

The audience or pupils will, of course, be located in front, and will only see the front map or chart at first, which may be No. 1. To exhibit the next map or chart or any one of the collection—No. 7, for instance—such map or chart is drawn out from the collection, as seen in Fig. 3, so that the surface or face of such map, chart, sheet, or picture may be exhibited, and the contents or figures delineated thereon may be fully explained. When a map or chart still further back—No. 8, for instance—is required, No. 7 is slid back into its place in the mass or series, and No. 8 is brought out, and so on as each or any of the maps, charts, &c., may be required.

By this improvement any required number of maps, charts, &c., may be exhibited without trouble or confusion.

I do not claim, broadly, the suspending of maps and charts on wires, rods, or strings, or the sliding of them on wires, rods, or strings; but what I point out as peculiar and new in my invention is the lever-brackets B, which accomplish the three-fold purpose of, first, suspending the entire apparatus on the wall; second, furnishing attachments for the suspending wires or rods; and, third, furnishing the means by leverage for straining and tightening the suspending wires or rods that the maps may hang perpendicular.

Having thus described my invention, I claim as new and desire to secure by Letters Patent—

The lever-brackets B combined with the suspending wires D, the shelf H, and the tension-rod G, or their equivalents, in the manner and for the purpose substantially as set forth.

The above specification of my invention signed by me this 25th day of September, 1871.

FRANK G. JOHNSON.

Witnesses:
 GEO. W. MABEE,
 T. B. MOSHER.